United States Patent
Smith

[15] 3,706,431
[45] Dec. 19, 1972

[54] AUXILIARY FLAP ACTUATOR FOR AIRCRAFT

[72] Inventor: Donald G. Smith, Kennesaw, Ga.
[73] Assignee: Lockheed Aircraft Corporation, Burbank, Calif.
[22] Filed: Jan. 14, 1971
[21] Appl. No.: 106,406

[52] U.S. Cl.............................................244/42 DA
[51] Int. Cl....................................................B64c 3/50
[58] Field of Search..244/42DA, 42DB, 42C, 42BR, 244/42 D, 43

[56] References Cited

UNITED STATES PATENTS 2,836,380  5/1958  Pearson..........................244/42 DB
2,908,454  10/1959  Wolff..............................244/42 DB Primary Examiner—Milton Buchler
Assistant Examiner—Carl A. Rutledge
Attorney—John N. Sullivan and George C. Sullivan

[57] ABSTRACT

This device controls movement of the wing vane, during the flap and vane deployment cycle. It retains the vane at its retracted position during initial flap motion and upon attainment of proper flap-vane gap, utilizes the flap's powered motion to attain both flap and vane extension/retraction, providing a rigid structural interconnect between the flap and vane during the vane deployment cycle.

10 Claims, 9 Drawing Figures

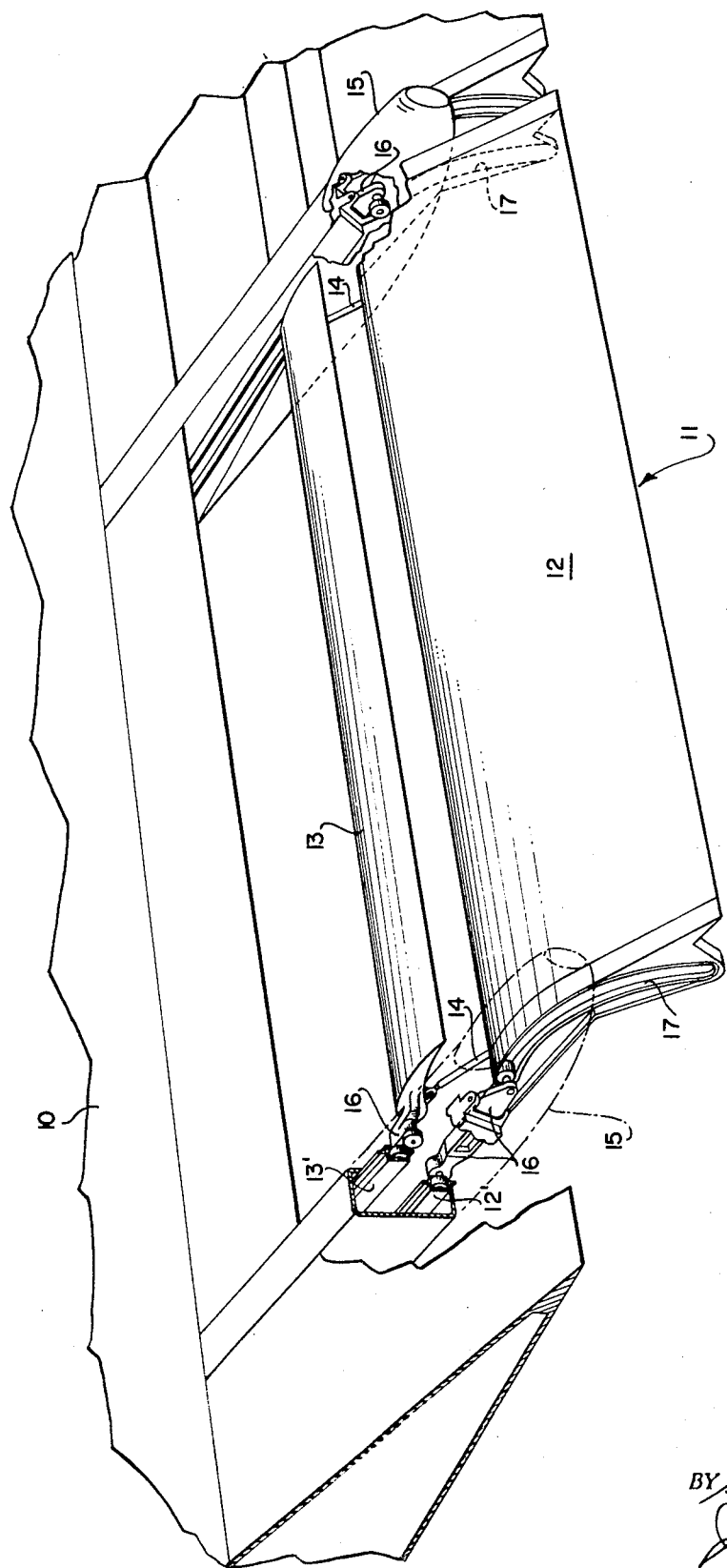
FIG_1

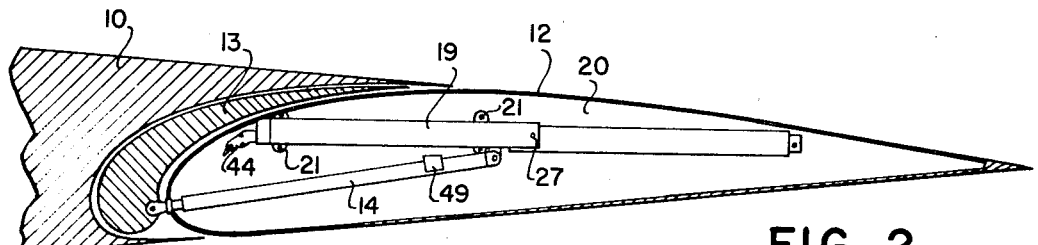
FIG_2
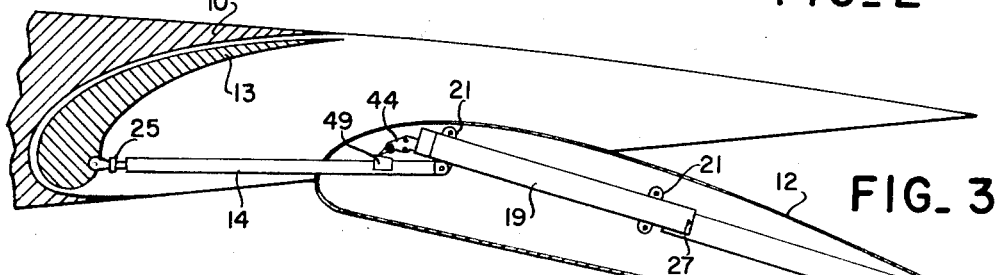
FIG_3
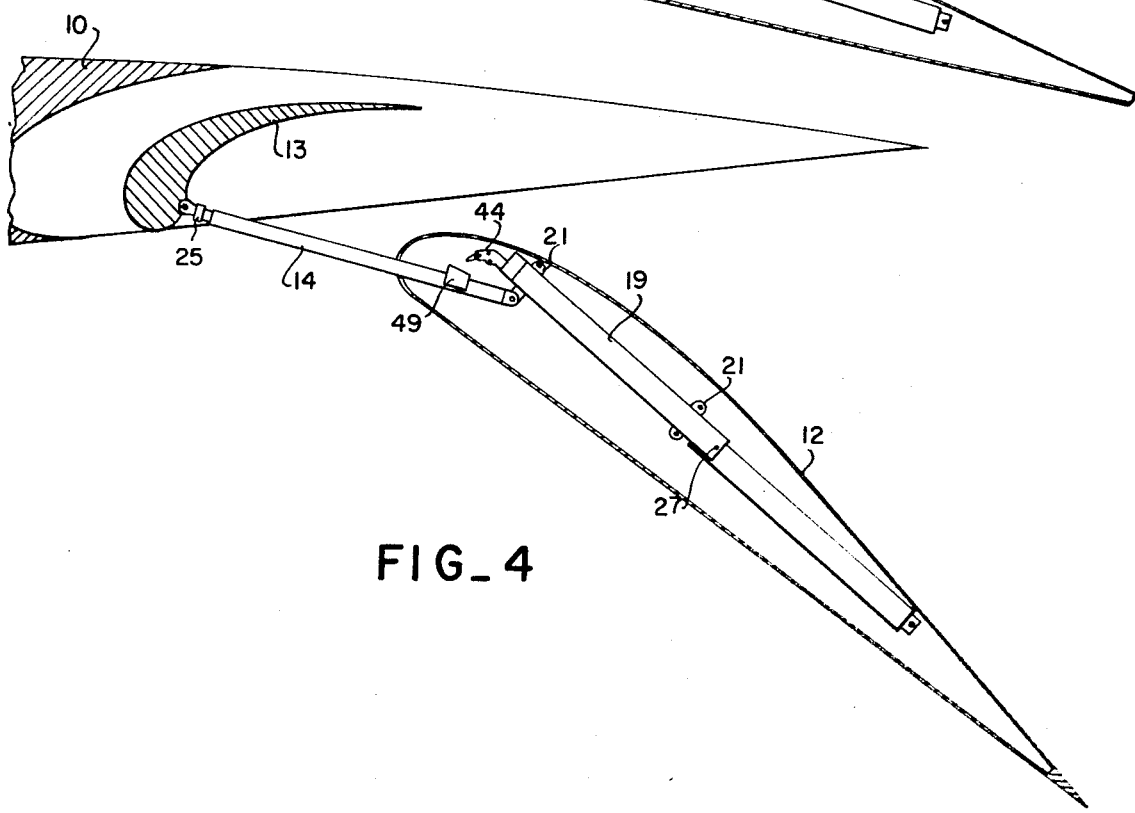
FIG_4
INVENTOR.
DONALD G. SMITH
BY George C. Sullivan, agent
John J. Sullivan
Attorney

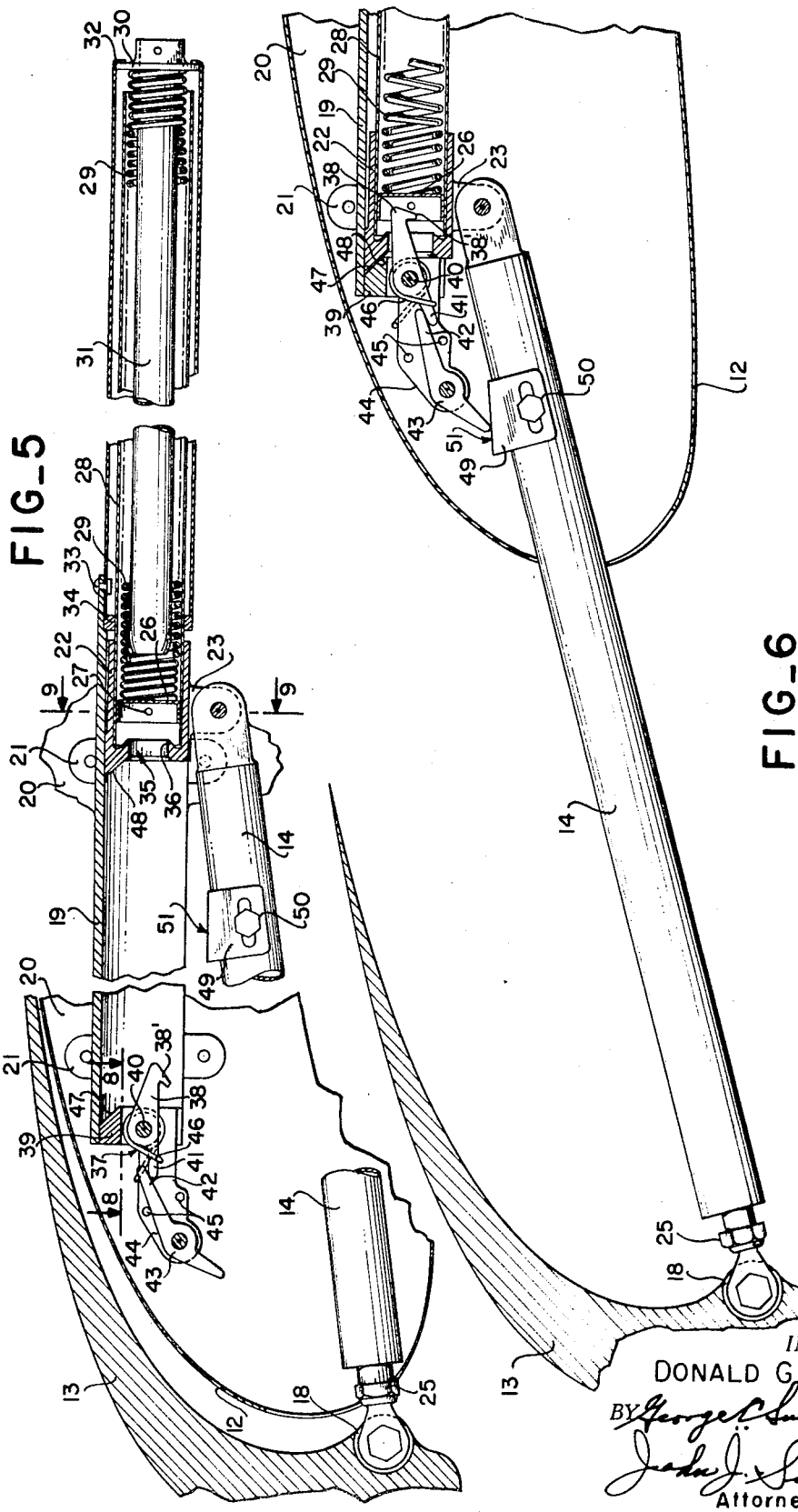

PATENTED DEC 19 1972 3,706,431
SHEET 4 OF 4
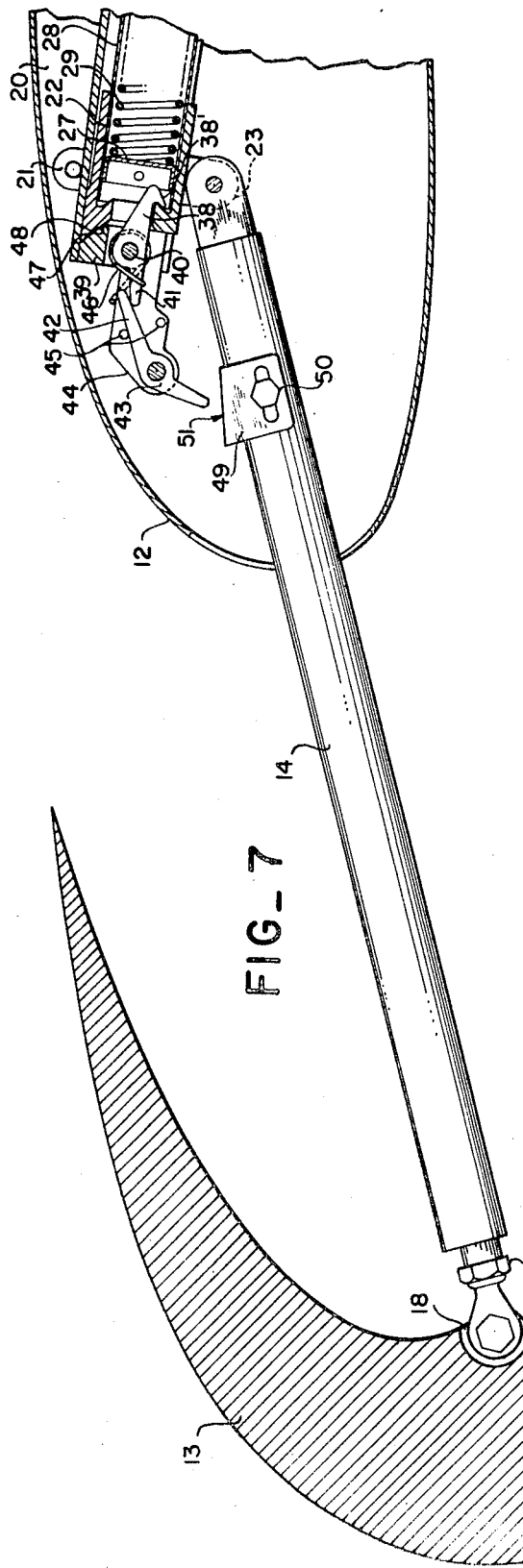
FIG_7
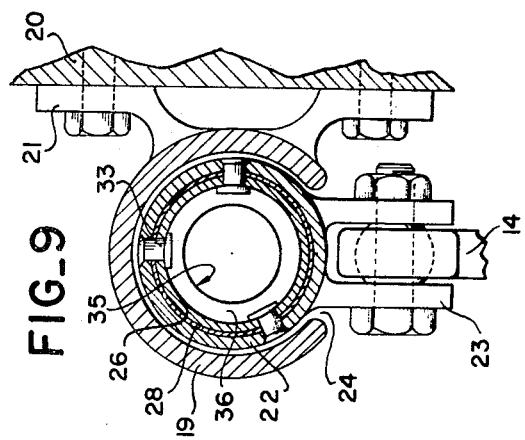
FIG_9
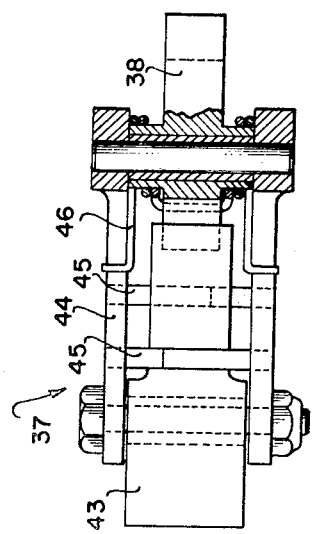
FIG_8
INVENTOR.
DONALD G. SMITH
BY George Sullivan, agent
John J. Sullivan
Attorney

AUXILIARY FLAP ACTUATOR FOR AIRCRAFT

This invention relates broadly to multiple flap systems as employed on aircraft wings to increase the efficiency thereof under various operating conditions or regimes of the aircraft, as well as to give the aircraft a greater range of operating capability, i.e., versatility, and more particularly to an actuator for an auxiliary flap within such a system.

In multiple flap systems, the main flap and auxiliary flap or flaps are designed and constructed to nestle substantially one with the next during level flight and high performance operation of the aircraft. During this operation the multiple flaps constitute, in effect, an aerodynamically clean continuation of the fixed wing terminating in a trailing edge. For high lift, as for example during take-off and for high drag during landing, these multiple flaps are extended or protracted from the wing to predetermined positions. During this transition, the auxiliary flap is required to be moved relative to the main flap, i.e., extended in a predetermined articulated fashion in order to be effective.

In the more sophisticated of these multiple flap system designs, deployment of the main and auxiliary flaps to and retraction from the high lift and high drag positions is required to be related through specifically designed interconnecting means whereby their movement is coordinated and synchronized in an automatic program. Such predetermined automatic and synchronized movement is, however, complicated by the fact that these main and auxiliary flaps in larger aircraft are each made up of segments disposed spanwise of the wing and these segments must be additionally interconnected for operation in unison. This, plus the aerodynamic loads to which the segments and the several flap components are exposed, tends to cause vibration and chatter eventually rendering them inoperative and defective.

The present invention addresses itself to the above general requirements and proposes an auxiliary flap actuator having optimum characteristics considering all factors, i.e., reliability, simplicity, strength-to-weight ratio, maintainability, and durability. To these ends, the main flap motion during extension and retraction is employed to attain the desired movement of the auxiliary flap or vane, as it is more commonly called, during which a predetermined spacing between the flap and vane is maintained throughout the total operating cycle. This movement is designed to permit compact stowage of flap and vane within the airfoil contour or envelope.

The entire auxiliary flap actuator assembly is maintained divorced from the flap drive system as a compact, self-contained unit to facilitate its removal and replacement or otherwise servicing without flap drive disturbance. Moreover, this actuator assembly performs for all intents and purposes like a rigid strut during deployment and retraction of the flap and vane so as to act in compression and/or tension, thus minimizing flap and vane vibration. At the same time, its composition is such as to obviate the use of extensive mechanical drives and complex linkages which are prone to malfunction and/or bind giving them a relatively short service life, if not destructive to the aircraft since the aircraft operation depends to a great extent on the proper functioning of these flaps.

More specifically the actuator herein proposed is secured at opposite ends to the flap and the associated vane. When the flap assembly is deployed, by whatever agency, the main flap initially moves aft but the vane actuator operates to maintain the vane within the wing at its fully retracted position until the flap reaches a preestablished position. Thereafter, the vane actuator operates to transmit force applied to the flap onto the vane whereby the vane and flap continue to move in unison and a desired space or gap is maintained therebetween. Final operation of the actuator occurs after the vane and flap have moved in unison to a preselected position. At this time, the actuator is made a rigid link between the flap and vane to maintain them in fixed relative position throughout movement to the ultimate fully deployed position. In retraction, this vane actuator operation and the flap and vane movement is reversed.

With the above and other objects in view as will be apparent, this invention consists in the construction, combination and arrangement of parts all as hereinafter more fully described, claimed and illustrated in the accompanying drawings wherein:

FIG. 1 is a perspective view of a fragment of an aircraft wing incorporating a typical multi-flap system to show generally the relationship of the main flap with the associated vane and modified to accommodate an actuator constructed in accordance with the teachings of this invention;

FIG. 2 is a section taken through the flap and vane combination as generally illustrated in FIG. 1, however showing the fully retracted position thereof, i.e., the position corresponding to level, high performance flight of the aircraft to illustrate primarily the actuator mechanism herein proposed which interconnects the flap and vane and is employed to extend and retract the vane with respect to the flap;

FIG. 3 is a similar view showing the flap in a partially deployed position with the vane in its fully retracted position within the wing and in spaced relation with the extended flap;

FIG. 4 is a similar view showing the flap in the fully extended or deployed position, the vane having been extended from the wing by operation of the actuator mechanism;

FIG. 5 is a longitudinal section taken through the actuator in order to show primarily the component parts thereof and its construction with the associated portions of the flap and vane illustrated in the fully retracted position of FIG. 2;

FIG. 6 is a similar section through the actuator mechanism and associated portions of the flap and vane disposed in a position similar to that of FIG. 3;

FIG. 7 is a section like FIG. 6, however showing the forward end of the actuator mechanism and associated flap and vane portions in the position of FIG. 4;

FIG. 8 is a section taken along the line 8—8 of FIG. 5 to show the details of the lock mechanism of the actuator which secures the vane and flap in relatively fixed positions during the deployment operation and when fully deployed; and FIG. 9 is a section taken along line 9—9 of FIG. 5 to show more clearly the details of the connection between the actuator mount in the flap and its connection to the vane.

Referring more particularly to the drawings, 10 designates a fragment of an aircraft fixed wing adjacent the aft portion or trailing edge thereof to which a flap system 11 is conventionally connected. In larger aircraft, the flap systems are comprised of multiple sections located in spanwise relationship to each other, although for present purposes only a single such section is considered, since all of the sections are for all intents and purposes herein the same.

Referring particularly to FIG. 1, this multi-flap system is formed by a main flap 12 and an auxiliary flap or vane 13 connected thereto through a push rod 14 at each end thereof. The vane 13 and flap 12 are each independently mounted to stationary wing structure, for example in respective spanwise runners 13' and 12' at each end thereof so that the only interconnection between the vane 13 and flap 12 is through the push rods 14.

Where necessary the supporting structure of the wing 10 extends beyond the profile and is housed in an appropriate fairing 15 with roller carriages 16 operative between a track 17 in each end of the flap 12 and the associated runner 12' carried by the wing 10. A roller-carrying arm 16 extending at each end of the vane 13 operatively mounts the vane 13 on its runners 13'. So far as the present invention is concerned such mounting of the vane 13 and flap 12 to the wing 10 is of no importance, it being only necessary to know that each is independently mounted to the wing structure for its deployment and retraction by appropriate drive (not shown) in conventional manner.

Interconnection of the vane 13 to its associated flap 12 is accomplished solely through the push rods 14 as stated above. For this purpose the vane 13 is provided with a clevice 18 and a cylindrical actuator housing 19 is secured to the flap structure, such as for example an adjacent transverse rib 20, through mounts 21 forming, in effect, an integral part of the cylindrical housing 19.

Mounted for reciprocation in the housing 19 is a piston 22 which is generally cup-shaped and carries a depending clevice 23 which extends beyond the wall of the housing 19 passing through an axial slot 24 (FIG. 9) provided therein for this purpose. The opposite ends of each push rod 14 are connected to the vane clevice 18 and this piston clevice 23, the rod 14 being provided at its forward end with a fitting 25 threadably mounted therein to allow predetermined linear adjustment in its length.

Internally, the piston 22 is provided with a transverse closure or wall 26 medially of its length which is secured thereto in appropriate manner as for example by rivets or pins 27. One end of a tube 28 is also mounted in the piston 22 being seated against the base wall thereof and is secured in place for example by means of the same pins 27. The tube 28 extends in an aft direction of the flap 12 and houses a compression spring 29. The wall 26 in the piston 22 acts as an abutment for one end of the spring 29 while the other spring end abuts an end wall 30 of the actuator housing 29. This end wall 30 is, in fact, secured to and constitutes a lateral flange about the remote aft end of a spring guide 31 which passes internally of the spring 29 and is retained in a fixed position with respect to the actuator housing 19 by means of a base flange 32 on the outer end thereof. To facilitate installation, the housing 19 is made in two parts which overlap at adjacent ends and secure one to the other as for example at 33.

When fully compressed, the spring 29 is of slightly less diameter than the internal diameter of the piston tube 28, while in the fully extended position, defines an internal diameter slightly larger than the external diameter of the spring guide 31. The length of the guide 31 is established as just less than that of the spring 29 when fully compressed so as to assure its ability to fully compress prior to contact between the guide 31 and piston wall 26.

Mounted within the housing 19 in a fixed position to guide and provide support of the piston tube 28 when the spring 29 is fully extended is an annular ring support 34. This support 34 is secured in any suitable manner to the housing 19 and extends radially inward to abut the external surface of the piston tube 28 and maintain it in a stable position throughout the entire length of and during its movement.

At its forward end, the piston 22 is recessed centrally and perforated as at 35 to create a lip 36 for coaction with a latch mechanism 37 mounted on the forward end of the housing 19. This latch mechanism 37 is formed by a hook lever 38 mounted within the housing 19 on a pin 40 disposed transversely of the housing 19 in an end wall 39 thereof with its hook end 38' extending inwardly of the housing 19, i.e., towards the piston 22.

At its opposite end, this lever 38 terminates in an arm 41 which is adapted to overlap and engage a corresponding arm 42 on a bellcrank lever 43 mounted for rotation at the outer end of a bracket 44 secured to and extending from the end wall 39 of the housing 19. As best shown in FIG. 8 the bracket 44 is bifurcated so as to straddle the lever 38 and bellcrank lever 43 and carries projecting stops 45 on each side of the lever 43 to restrict its rotation.

The hook lever 38 is biased by a torsion spring 46 or the equivalent into a clockwise direction (FIGS. 5, 6, and 7) and this normal action of the torsion spring 46 may be overpowered by clockwise rotation of the bellcrank lever 43 which exerts a downward force on the lever arm 41 forcing the hook 38' in a counter-clockwise direction. Thus moved, the hook 38' is placed in alignment with for passage through the opening 35 in the end wall of the piston 22. However, when the force applied to the bellcrank lever 43 is removed and the lever 38 is allowed to swing under the action of its spring 46, the hook 38' rotates in a clockwise direction, and when located in the opening 35 it moves downward to engage the lip 36. The angular disposition of the lip 36 including the defining surfaces thereof corresponds with and is complemental to the hook 38' and its surfaces so as to facilitate movement of the hook 38' over the lip 36 and into and out of the opening 35 as well as to immovably engage the lip 36 to lock the piston 22 to the cylinder 19.

The inner face of the end wall 39 of the housing 19 at the top thereof is recessed as at 47 and a complemental projection 48 is formed on and extends from the outer face of the piston 22 so as to seat in this recess 47 when the piston 22 is adjacent this end of the housing 19. This assures a proper radial positioning of the piston 22 in its housing 19 as well as helps to secure it against vibration.

In view of the foregoing construction and arrangement, upon initial operation of the flap system, the main flap 12 is deployed or extended in an aft direction. At this time, the vane 13 is maintained in the retracted position due to the fixed length push rods 14 and the force applied thereto by the spring 29 which is free to extend with the movement of the flap 12. When the flap 12 has moved a distance equal to the piston stroke, piston 22 contacts the end wall 39 of the housing 19 preventing further extension of spring 29 (FIG. 6) and continued movement of the flap 12 causes a concurrent movement of the vane 13.

In order to permit this contact of piston 22 with housing end wall 39, a striker attachment 49 carried on the push rod 14 is adapted to contact the bellcrank lever 43 causing the counterclockwise rotation of the hook 38' allowing it to pass into the opening 35 when the piston 22 approaches the end of the housing 19. At a pre-established angular deflection, the flap 12 begins to rotate moving the bellcrank 43 out of contact with the striker 49 at which time the hook 38' under normal action of its spring 46 engages the lip 36 of the piston 22 and the vane 13 and flap 12 are fully locked thereby (FIG. 7). Throughout the continued movement of the flap 12 to its ultimate position, this locked condition is maintained.

As an added feature, the striker attachment 49 is adjustable mounted on the push rod 14 through a slot and pin arrangement 50. The length of the slot is such to cover the required range of the adjustment. Also the surface of the attachment 49 adjacent the bellcrank 43 is slanted as at 51 to facilitate the setting of this adjustment.

In the reverse operation, the flap 12 is retracted to the predetermined angular deflection when bellcrank lever 43 contacts the striker 49 and is rotated thereby so as to disengage lever hook 38' from the lip 36 unlocking piston 22 from engagement with end wall 39. When forward motion of vane 13 is stopped on attaining its fully retracted position by abutment with structure of the wing 10, spring 29 is compressed by continued movement of the flap 12 and the hook 38' is moved out of the piston 22 through opening 35. Continued retraction motion of the flap 12 causes continued compression of the spring 29 and decrease of the gap between vane 13 and flap 12 until flap 12 and vane 13 are once again nested with the airplane wing 10.

While the invention has been hereinabove illustrated and described in what is believed its best embodiment at this time, various modifications and arrangements will suggest themselves to those skilled in the art. These variations will fairly fall within the broad concepts of the invention as covered by the appended claims.

What is claimed is:

1. An auxiliary flap actuator for aircraft comprising a tubular housing disposed internally of and secured to fixed structure within a main flap to extend generally in a chordwise direction, a piston mounted for reciprocation within said housing, a drive operative on said piston to move it to the forward end of said housing, a push rod pivotally connected at one end to said piston and at the other end to the auxiliary flap, a lock mechanism carried by said housing at the forward end thereof engageable and disengageable with said piston, and a latch responsive to movement of said main flap in each direction for the operation of said lock mechanism to positions of engagement to connect said push rod in rigid extension from said main flap upon movement of said main flap in one direction and disengagement to release said push rod for reciprocation relative to said main flap upon movement of said main flap in the other direction.

2. The actuator of claim 1 wherein said housing and said piston include coacting, mating elements establishing and maintaining the predetermined, relative radial position thereof.

3. The actuator of claim 1 wherein said drive includes a compression spring disposed between said piston and the aft end wall of said housing.

4. The actuator of claim 3 including a guide rod secured to and extending from said housing aft end wall and passing through said compression spring, the transverse dimension of said guide rod being substantially equal to the internal dimension of said compression spring when said spring is in the relaxed condition.

5. The actuator of claim 1 wherein a push rod is connected as aforesaid to each flap end and including an adjustment in each said push rod to vary the overall length thereof.

6. The actuator of claim 1 wherein said latch includes a bellcrank having an arm disposed in the path of movement of a striker carried by said push rod during movement of said main flap.

7. The actuator of claim 6 including a slidable connector mounting said striker to said push rod whereby the position of the former may be adjusted on the latter within a preselected range.

8. The actuator of claim 7 wherein said striker includes a surface having a length and disposition sufficient to insure engagement with said bellcrank arm corresponding to predetermined movement of said main flap as aforesaid.

9. The actuator of claim 1 wherein said lock mechanism includes a lever terminating in a hook and said piston includes an opening defined by a lip having surfaces complemental to said hook to facilitate the entry and withdrawal of said hook into and out of said opening as well as the interengagement thereof when said hook is in said opening.

10. The actuator of claim 1 wherein said lever is spring-loaded in the direction to engage said lip and said latch includes a bellcrank having one arm disposed in the path of movement of a striker carried by said push rod during movement of said flap and the other arm operative on said lever in opposition to the action of its spring.

* * * * *